Nov. 27, 1934.　　　I. HECHENBLEIKNER　　　1,982,099
APPARATUS FOR THE TREATMENT OF GASEOUS PRODUCTS
Filed Sept. 23, 1931　　2 Sheets-Sheet 1
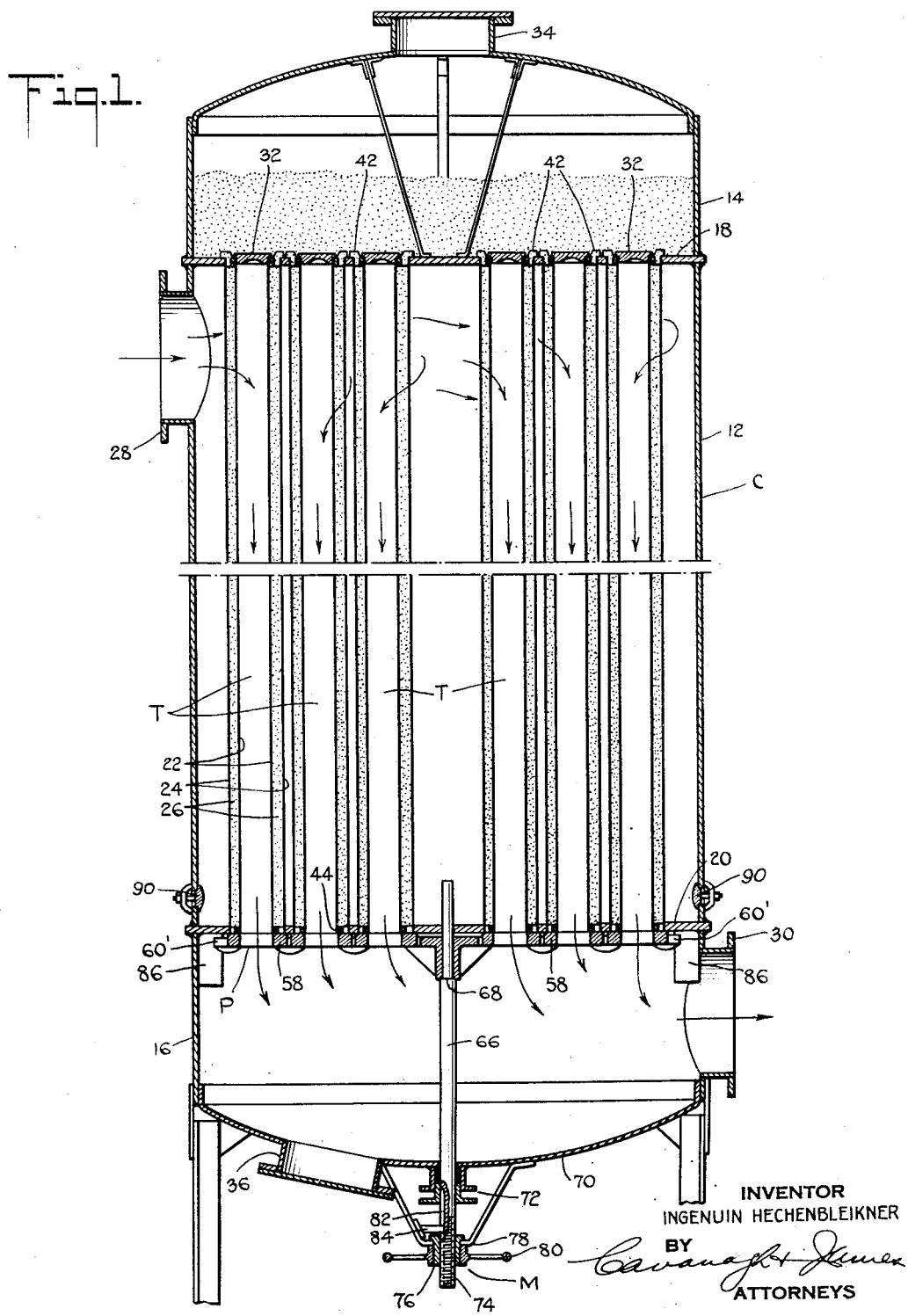

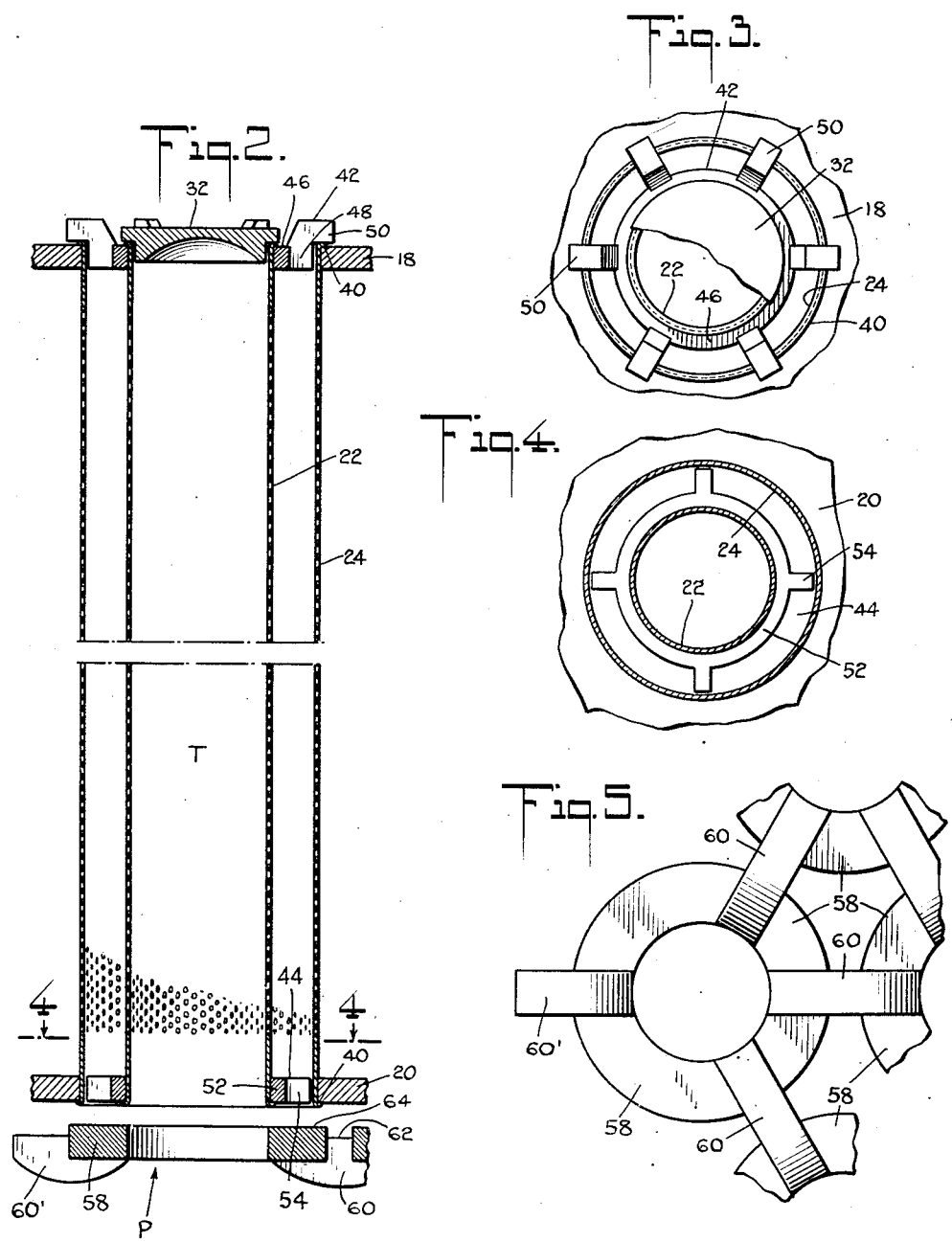

Patented Nov. 27, 1934

1,982,099

UNITED STATES PATENT OFFICE 1,982,099

APPARATUS FOR THE TREATMENT OF GASEOUS PRODUCTS

Ingenuin Hechenbleikner, Charlotte, N. C., assignor to Chemical Construction Corporation, Charlotte, N. C., a corporation of Delaware Application September 23, 1931, Serial No. 564,518

2 Claims. (Cl. 183—46)

This invention relates to apparatus for the treatment of gaseous products, and more particularly to such apparatus in which the medium or mass for treating the gaseous product is in granulated form.

It is frequently desired to treat a gas by passing the same through a granulated medium or mass. Common examples are filtration of a gas by passing the same through sand or other granulated filtering medium in order to remove dust or other impurities from the gas, and causing catalytic reactions to take place in a gas by passing the same through a catalytic agent which is held in a granulated medium or mass. The present invention is described herein as specifically applied to the filtration of a gas, particularly for the removal of dust from sulphur dioxide gas in the manufacture of sulphuric acid, but it will be understood that the apparatus is equally useful for catalytic conversion as, for example, the oxidation of sulphur dioxide gas to sulphur trioxide or sulphuric acid anhydride by passing the same through a platinum or vanadium catalyst, and any other process in which it is similarly desired to bring a gas and a preferably granulated medium into intimate contact.

In my Patent No. 1,929,246, dated October 3, 1933, I have explained that while equal filtration may be obtained by passing a gas through filtering medium of small area and large thickness, or large area and small thickness, the latter is preferable because it requires less power for the propulsion of the gas therethrough, there being low resistance and low velocity of flow, and for other reasons there set forth. Such filters, however, ordinarily occupy undue space, and in the aforesaid copending application I describe an improved filter which overcomes this difficulty and is exceedingly compact in external dimension while functionally operating as a filter of extremely large area. A widely different type of filter is disclosed in my prior Patent No. 1,782,823, issued November 25, 1930, in which I disclose a gas filter having a small area, large thickness, filter mass which is itself arranged for continuous circulation, it being withdrawn from the bottom of the filter chamber, sifted and cleaned, and thereafter elevated by a continuous belt or bucket conveyor and delivered to the top of the filter chamber.

The object of the present invention resides generally in the provision of an apparatus which will combine all of the advantages without suffering from any of the disadvantages of the two filters last referred to, that is, to provide an apparatus which will be compact in external dimension but which will operate functionally as a filter of large area and small thickness, and which will at the same time make possible continuous circulation and cleaning of the filter mass, or which, should continuous circulation not be necessary, will make possible intermittent replacement of the filter mass with or without cleansing and re-use of the old filter mass, all without shutting down the operation of the plant or disassembly of the filter apparatus.

To the accomplishment of the foregoing and such other objects as may hereinafter appear, my invention resides in the apparatus elements and their relation one to the other as hereinafter more particularly described in the specification and sought to be defined in the claims. The specification is accompanied by drawings in which:

Fig. 1 is a section taken in elevation through a preferred form of apparatus embodying my invention;

Fig. 2 is a detail section on an enlarged scale through one of the units of the apparatus;

Fig. 3 is a view in plan, partly in section of the unit shown in Fig. 2;

Fig. 4 is a section taken in the plane of the line 4—4 in Fig. 2; and

Fig. 5 is an inverted plan or bottom view of a fragment of the retaining plate of the apparatus.

Referring to the drawings and particularly to Fig. 1 thereof, the apparatus of the present invention comprises a shell or casing C including an intermediate section 12 separated from top and bottom sections 14 and 16 by means of header plates 18 and 20, and a plurality of units T for supporting the granular material through which the gas to be treated is passed. The said units T are supported in the intermediate section 12 of the casing between the header plates 18 and 20. Each of the units T includes a perforated inner tube 22 mounted within and concentrically related to a perforated outer tube 24. The annular space 26 between the tubes 22 and 24 is filled with the filter mass, catalyst mass, or other material with which the gas is to be treated.

The intermediate section 12 of the casing is provided with a gas flow nozzle 28 which is preferably used as a gas inlet. One of the end sections of the casing, preferably the lower section 16, is provided with a gas nozzle 30 which is preferably used as an outlet. The tubes 22 defining the inside of the units T are closed at their upper ends, as is indicated at 32, but are open at their lower ends, permitting free communication with the bottom section 16 of the casing C. It will be evident from this brief summary that gas flowing into nozzle 28 will circulate around the inside of the casing and surround the bank or nest of the units T, and thence will flow through the perforated walls thereof and the granulated mass held therebetween to the inside of the units, after which the treated gas flows downwardly from the units to the bottom section 16 and thence out of the gas outlet 30, all as is schematically indicated by the arrows on the drawings.

It may further be briefly remarked at this point that a fresh supply of granulated material may be fed into the apparatus through a feed opening 34 located in the upper section 14 of the casing, which for this purpose acts as an upper or feed hopper, and that the said material is permitted to flow downwardly through header plate 18 into the annular spaces 26 between the inner and outer tubes 22 and 24. This granulated material or medium is retained in the units T by a retaining plate generally designated P which is adjustable, preferably by simple vertical reciprocation toward and away from header plate 20 by manual control mechanism generally designated M. Downward movement of the retaining plate P permits discharge of the granulated material into the bottom section 16 of the casing which, for this purpose acts as a lower or discharge hopper, and the used material may be removed from the lower hopper through a discharge opening 36.

The construction of the units T is next described in greater detail with particular reference to Figs. 2, 3, and 4 of the drawings. In these figures it will be noted that the outer tube 24 is closely perforated throughout its surface area except at the top and bottom ends thereof. These ends are preferably expanded and beaded over and thus secured to the header plates 18 and 20, as is indicated at 40. The inner tube 22 is spaced from and concentrically related to the outer tube 24 by an upper spacing member 42 and a lower spacing member 44. The upper spacing member 42 comprises a continuous ring 46, over which the upper end of tube 22 is beaded, and radial spacer fingers 48 each of which includes a stepped projection or lug 50 which supports the spacer member 42 and with it the inner tube 22. The bottom spacer member 44 comprises a continuous ring 52 over which the lower end of tube 22 is beaded, and a plurality of spacer fingers 54. The spacer member 44 is supported by the tube 22. In assembling the apparatus it will be understood that tube 22 may be preliminarily expanded within and secured to the upper and lower spacer members 42 and 44, and may thereafter be lowered within the outer tube 24. The upper end of tube 22 is preferably closed by a cap or plug 32 which is simply pushed into place at the top end of the tube.

A fragment of the retaining plate P is clearly shown in Figs. 2 and 5, referring to which it will be seen that the retaining plate consists of a large number of continuous rings of metal 58 each of which is dimensioned to close the annular space between the inner and outer tubes 22 and 24, and all of which are so mutually related and disposed as to properly mate with and simultaneously close the bottom ends of the annular spaces of all of the units. The rings 58 are interconnected by a plurality of ribs 60, and the upper edges 62 of these ribs are preferably depressed below the upper faces 64 of the rings 58, as is clearly shown in Fig. 2. The holes within rings 58 are intended, of course, to permit free flow of the gas through plate P even when it is closed against the lower ends of the units T. The use of ribs 60 instead of a filled-in area of plate, permits free discharge of the granular-mass or medium from the units when the plate P is lowered to a position such as is shown in Fig. 2. The depression of the top surfaces 62 of the ribs 60 insures that close fit of the rings 58 against the lower ends of the units will not be prevented by any residual sand or other medium remaining on the top of the retaining plate P.

Reverting now to Fig. 1, it will be seen that the plate P is mounted on a stem 66 and is supported by a shoulder 68 formed thereon. The stem 66 is itself supported at its upper end by the header plate 20 and at its lower end by the end or bottom head 70 of casing C. The latter is preferably additionally provided with a gland and bushing, indicated generally at 72, in order to prevent gas leakage. The lower end 74 of stem 66 is threaded and is received by a nut 76 rotatably mounted in a pedestal 78 and rotated by a hand wheel 80. The lower end 74 of stem 66 is further provided with a keyway 82 which receives a fixed key 84, thereby preventing rotation of stem 66 while permitting vertical reciprocation thereof. Retaining plate P includes outwardly projecting ribs or fingers 60' which are vertically slidable between pairs of guide plates 86, and which prevent rotation of the plate P and thereby keep the sealing rings 58 thereof in proper registry with the units T. It will be evident that by rotation of hand wheel 80, the retaining plate P may be raised or lowered, and that when lowered, the granulated medium is permitted to flow from the upper hopper 14 through the annular spaces 26, and from the latter into the lower hopper 16.

If the granular mass is merely to be intermittently replaced, it is simply necessary to lower the retaining plate P for a short time, after which the used material may be withdrawn from the lower hopper 16 through the discharge opening 36. When necessary, a fresh supply of material may be added to the feed hopper 14 through the feed inlet 34. In many cases the used material may be cleaned and re-used. In no case is it necessary to disassemble the apparatus, and in many cases the operation of the plant need not be at all interrupted. If, however, continuous circulation and cleaning of the medium is desired, it is simply necessary to replace the blind flanges on feed inlet and discharge openings 34 and 36 by appropriate pipe connections, and to connect the lower pipe connection to any desired form of screening and cleansing mechanism together with a conveyor mechanism for elevating the cleaned material and feeding the same downwardly through the pipe connection. The apparatus described in my previously mentioned Patent No. 1,782,823 is quite suitable for this purpose. Any dust or dirt collected on the lower header 20 may be removed through a series of hand holes, such as the hand holes 90 in Fig. 1 of the drawings.

The apparatus as particularly constructed in the present example makes wide use of welding, the intermediate, upper, and lower sections, 12, 14, and 16 of the casing being welded to the header plates 18 and 20, and the various inlets and outlets being likewise preferably welded to the casing. The inner and outer tubes 22 and 24 of the units T are preferably made from flat perforated plates which are subsequently rolled and welded in tubular form. The upper and lower spacing members 42 and 44, the plugs 32, and the retaining plate P are all preferably and most simply made of cast iron.

As a specific example, I may mention that a filter unit for filtering the sulphur dioxide in a sulphuric acid plant of 90 tons daily capacity may comprise 40 filter units each 15 feet long and having inner and outer tubes respectively 6 and 10 inches in diameter. The walls of the tubes are provided with 1/8 inch holes spaced on centers 7/32 of an inch apart, the units being filled with 1/4 inch quartz pebbles.

While I have described the invention as applied to a filter, it is to be understood that it may equally well be used for other purposes, as, for example, catalytic conversion. When used as a converter, it possesses great advantages over the tray type of converter, because in contradistinction to the thick catalyst layer there used, resulting in fusing and caking of the material, the present apparatus utilizes a thin layer of large area, which results in low gas velocity, low temperature operation, and consequently does not result in fusing. In any event the dirty catalyst material may readily be changed and cleaned without causing plant shut-downs. A platinum or vanadium catalyst may be used in this manner for the catalytic conversion of sulphur dioxide to sulphur trioxide. If several conversion stages are used, as is preferably the case, inter-coolers are preferably located between the converters in order to provide for heat exchange.

It is believed that the mode of construction and operation, and the many advantages of my improved apparatus will, for the most part, be apparent from the foregoing detailed description thereof. The apparatus is compact in over-all dimension, yet presents an extremely large area of relatively thin mass or medium. This permits of low gas velocity, and offers little resistance to gas flow, so that only slight power is needed to force the gas through the apparatus. The medium may be changed continuously or intermittently without taking the same apart or shutting down the operation of the plant.

It will be understood that while I have shown the outside shell or casing cylindrical in form, this is not necessarily the case, and furthermore the individual units T while preferably circular in cross section, need not necessarily take this shape, for pairs of tubes of any desired cross section may be used. The gas flow, while shown from nozzle 28 to nozzle 30, may, if desired, be reversed to proceed from nozzle 30 to nozzle 28. The units are preferably arranged upright in order to facilitate transfer of the granular medium therethrough, but these may, in special cases, be arranged at a slope or even horizontally with appropriate provision for passing the granular medium therethrough.

It will therefore be apparent that while I have shown and described my invention in preferred form, many changes and modifications may be made in the structure disclosed, without departing from the spirit of the invention, defined in the following claims.

I claim:

1. An apparatus of the class described, comprising an upright cylindrical shell or casing having top and bottom heads and top and bottom header plates respectively spaced therefrom and defining upper and lower hoppers and an intermediate section, a plurality of upright units supported in the intermediate section between the header plates, each of said units comprising a pair of perforated concentric tubes, means in the top header plate preventing communication without or within the concentric tubes but permitting communication with the space therebetween whereby a supply of gas treating medium in the upper hopper flows downwardly in the units between the inside and outside tubes thereof, an adjustable retaining plate located beneath the bottom header plate for retaining the medium in the annular space between the tubes, the bottom header plate and the retaining plate permitting communication from the inside of the units to the lower hopper, a gas nozzle in the intermediate section of the casing, a gas nozzle in the lower hopper, a feed inlet for the medium in the upper hopper, a discharge outlet for the medium in the lower hopper, and means for adjusting the retaining plate in order to control the discharge of the medium from the units into the lower hopper.

2. A sand filter comprising an upright cylindrical shell or casing having top and bottom heads and top and bottom header plates respectively spaced therefrom and defining upper and lower hoppers and an intermediate section, a plurality of upright filter units supported in the intermediate section between the header plates, each of said filter units comprising a pair of perforated concentric tubes, means in the top header plate preventing communication without or within the concentric tubes but permitting communication with the space therebetween whereby a filter mass in the upper hopper flows downwardly in the filter units between the inside and outside tubes thereof, a vertically reciprocable retaining plate located beneath the bottom header plate for retaining the filter mass in the annular space between said tubes, the bottom header plate and the retaining plate permitting communication from the inside of the filter units to the lower hopper, a gas inlet in the intermediate section of the casing, a gas outlet in the lower hopper, a filter mass feed inlet in the upper hopper, a filter mass discharge outlet in the lower hopper, a hand wheel, and screw mechanism operated thereby for moving the retaining plate in order to control the discharge of the filter mass from the filter units into the lower hopper.

INGENUIN HECHENBLEIKNER.